United States Patent
Huang (10) Patent No.: US 9,895,866 B2
(45) Date of Patent: *Feb. 20, 2018

(54) ANISOTROPIC ORGANIC THIN FILM AND ITS MANUFACTURING METHOD

(71) Applicant: BOE TECHNOLOGY GROUP CO., LTD., Beijing (CN)

(72) Inventor: Wei Huang, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/769,340

(22) PCT Filed: Jan. 14, 2015

(86) PCT No.: PCT/CN2015/070650
§ 371 (c)(1),
(2) Date: Aug. 20, 2015

(87) PCT Pub. No.: WO2016/045263
PCT Pub. Date: Mar. 31, 2016

(65) Prior Publication Data
US 2016/0250826 A1  Sep. 1, 2016

(30) Foreign Application Priority Data
Sep. 26, 2014  (CN) .......................... 2014 1 0505698

(51) Int. Cl.
*B05D 1/36* (2006.01)
*B32B 27/08* (2006.01)
(Continued)

(52) U.S. Cl.
CPC ................. *B32B 27/08* (2013.01); *C08J 5/18* (2013.01); *C08J 7/04* (2013.01); *B32B 2457/202* (2013.01); *C08J 2300/12* (2013.01)

(58) Field of Classification Search
None
See application file for complete search history.

(56) References Cited

U.S. PATENT DOCUMENTS

2006/0188662 A1  8/2006 Farrand et al.
2006/0208266 A1  9/2006 Yamamoto
(Continued)

FOREIGN PATENT DOCUMENTS

CN  1588668 A  3/2005
CN  1684286 A  10/2005
(Continued)

OTHER PUBLICATIONS

Office Action in Chinese Patent Application No. 201410505698.2, dated Aug. 23, 2016.
(Continued)

*Primary Examiner* — Robert S Walters, Jr.
(74) *Attorney, Agent, or Firm* — Brooks Kushman P.C.

(57) ABSTRACT

Disclosed are an anisotropic organic thin film and its manufacturing method. The method includes steps of depositing a mixed solution including an ionic liquid and a polymerizable material on a substrate; separating positive ions from negative ions in the ionic liquid, so that the polymerizable material is aligned; polymerizing the aligned polymerizable material, so that an aligned first thin film is obtained after cured; and depositing liquid crystal molecules on the first thin film, and polymerizing the liquid crystal molecules to form a second thin film, wherein the second thin film is aligned in a way that matches with the first thin film, and the first thin film and the second thin film constituent the anisotropic organic thin film.

19 Claims, 4 Drawing Sheets (51) Int. Cl.
*C08J 5/18* (2006.01)
*C08J 7/04* (2006.01)

(56) References Cited

U.S. PATENT DOCUMENTS

| | | | |
|---|---|---|---|
| 2010/0244000 A1 | 9/2010 | Tanaka et al. | |
| 2012/0075568 A1* | 3/2012 | Chang ................. | G02B 5/3016 349/194 |
| 2015/0060800 A1 | 3/2015 | Qiu et al. | |

FOREIGN PATENT DOCUMENTS

| CN | 1751111 A | 3/2006 |
|---|---|---|
| CN | 1881647 A | 12/2006 |
| CN | 101106179 A | 1/2008 |
| CN | 101425563 A | 5/2009 |
| CN | 103151461 A | 6/2013 |
| CN | 103913891 A | 7/2014 |
| JP | 2011-184541 A | 9/2011 |

OTHER PUBLICATIONS

International Search Report and Written Opinion in PCT International Application No. PCT/CN2015/070650, dated Jul. 2, 2015.
Restriction Requirement on U.S. Appl. No. 14/770,302 dated Apr. 3, 2017.
Non-Final Office Action on U.S. Appl. No. 14/770,302 dated Jun. 2, 2017.
First Office Action for Chinese Application No. 201410505119.4, dated Jul. 26, 2016, 6 Pages.
Second Office Action for Chinese Application No. 201410505119.4, dated Mar. 22, 2017, 3 Pages.
International Search Report and Written Opinion for Application No. PCT/CN2015/070499, dated Jun. 17, 2015, 10 Pages.

\* cited by examiner

ANISOTROPIC ORGANIC THIN FILM AND ITS MANUFACTURING METHOD

CROSS-REFERENCE TO RELATED APPLICATIONS

This application is the U.S. National Phase of PCT Application No. PCT/CN2015/070650 filed on Jan. 14, 2015, which claims a priority to Chinese Patent Application No. 201410505698.2 filed on Sep. 26, 2014, the disclosures of which is incorporated in its entirety by reference herein.

TECHNICAL FIELD

The present disclosure relates to the field of thin film manufacturing technology, in particular to an anisotropic organic thin film and its manufacturing method.

BACKGROUND

An anisotropic organic thin film has been used broadly because its physical property changes with different directions, it has been used for, such as a polaroid, a light-brightening film and an alignment film used in a TFT-LCD (thin film transistor-liquid crystal display) panel, a dielectric film used in printed electronics, and an osmotic membrane used in a gas sensor.

In general, the anisotropic organic thin film is manufactured by a mechanical stretching or mechanical friction processing method. The mechanical stretching method is suitable for the case that the anisotropic organic thin film is attached in a subsequent step. The anisotropic organic thin film obtained in such manner is of a relative large thickness. In addition, the attaching process causes no damage on a processed electronic component. The mechanical friction method is suitable for an electronic component with a planar surface to be processed, while it has a shadow effect on a patterned stereoscopic component, and particles generated in friction may cause electronically invalidation of component. In the manufacturing of components, stereoscopic components account for a relative large proportion, which require the thin film thereon having a relative thin thickness, as a result, neither the existing mechanical stretching method nor the mechanical friction method could meet the requirement.

SUMMARY

An object of the present disclosure is to provide an anisotropic organic thin film and its manufacturing method, so as to solve the above technical problems existing in manufacturing of the anisotropic organic thin film by the mechanical stretching method or the mechanical friction method.

In order to address the above technical problems, the present disclosure provides in embodiments a method for manufacturing an anisotropic organic thin film, which includes steps of:

depositing a mixed solution including an ionic liquid and a polymerizable material on a substrate;

separating positive ions from negative ions in the ionic liquid, so that the polymerizable material is aligned;

polymerizing the aligned polymerizable material, so that an aligned first thin film is obtained after cured; and depositing liquid crystal molecules on the first thin film after removing the ionic liquid, and polymerizing the liquid crystal molecules to form a second thin film, wherein the second thin film is aligned in a way that matches with the first thin film, and the first thin film and the second thin film constituent the anisotropic organic thin film.

Alternatively, the ionic liquid has a side-chain group.

Alternatively, the side-chain group is a fluoride group.

Alternatively, the mixed solution further includes a film-forming agent.

Alternatively, the ionic liquid is a liquid crystal ionic liquid, and the positive ions are separated from the negative ions in the ionic liquid under the action of unidirectional ionic wind or an external electric field, so that the polymerizable material is aligned.

Alternatively, the polymerizable material is a photopolymerizable material.

In another aspect, the present disclosure provides in embodiments an anisotropic organic thin film, which includes:

a first thin film formed on a substrate, wherein the first thin film is formed by aligning and polymerizing a mixed solution including an ionic liquid and a polymerizable material; and a second thin film formed on the first thin film, wherein the second thin film is formed by crystal molecules through polymerization and is aligned in a way that matches with the first thin film.

The present disclosure has the following beneficial effects. According to the above embodiments, the ionic liquid is used as an medium and is aligned under the action of an external electric filed, so that the polymerizable material is aligned; then the aligned polymerizable material is polymerized and cured, so as to obtain an aligned polymer phase state template; and then liquid crystal molecule monomers deposited on the polymer phase state template are polymerized, so that the anisotropic organic thin film is obtained. The method for manufacturing the anisotropic organic thin film has advantages of being realized by a simple process, being capable of manufacturing the anisotropic organic thin film with a large area, and low cost. The manufactured anisotropic organic thin film is of a relative thin thickness, and defects caused by particles generated in mechanical friction do not exist since no mechanical friction is performed.

BRIEF DESCRIPTION OF THE DRAWINGS

In order to illustrate the technical solutions in the embodiments of the present disclosure or the related art in a more apparent manner, the drawings used for illustrating the embodiments of the present disclosure and the related art will be described briefly below. Obviously, the following drawings merely show some of the embodiments of the present disclosure, and based on these drawings, a person skilled in the art may obtain the other drawings without any creative effort.

DETAILED DESCRIPTION

An object of the present disclosure is to manufacture an anisotropic organic thin film suitable for a patterned stereoscopic component. Processes in the related art, including mechanical stretching or mechanical friction, are of respective defects, for example, an anisotropic organic thin film manufactured by the mechanical stretching is of a relative large thickness, while an anisotropic organic thin film manufactured by the mechanical friction has undesirable effects caused by particles generated in friction.

In order to solve the above problems, the present disclosure provides in embodiments a method for manufacturing an anisotropic organic thin film. The anisotropic organic thin film manufactured by the method according to embodiments of the present disclosure is of a relative thin thickness, and undesirable effects caused by particles generated in friction do not exist, thereby is particularly suitable for the stereoscopic component.

According to embodiments of the present disclosure, an ionic liquid is used as an medium and is aligned under the action of an external electric filed, so that the polymerizable material is aligned; then the aligned polymerizable material is polymerized and cured, so as to obtain an aligned polymer phase state template; and then liquid crystal molecule monomers deposited on the polymer phase state template are polymerized, so that the anisotropic organic thin film is obtained. According to embodiments of the present disclosure, the polymerizable material is a polymerizable liquid crystal monomer. In general, the polymerizable liquid crystal monomer is in a solid state at room temperature; and the polymerizable liquid crystal monomer may be converted into a liquid crystal state by means of decreasing a melting point via mixing with a micromolecule liquid crystal, an ionic liquid, etc., so as to be with a liquid crystal property, thereby the polymerizable liquid crystal monomer can be aligned in response to molecule force of an electric filed, a magnetic field, and alignment energy state. The micromolecule liquid crystal and the ionic liquid used may be removed by a chemical method, and only the polymer phase state template formed by polymerization of the polymerizable liquid crystal monomer is remained. According to embodiments of the present disclosure, the polymerizable liquid crystal monomer is of a structural characteristic in consistent with that of a liquid crystal material defined in liquid crystal chemistry, except differences that an external group at one side or both sides are polymerizable groups such as acrylate, and there is a rigid group in the middle, and the polymerizable group is connected to the rigid group through a flexible alkyl chain. According to embodiments of the present disclosure, the polymerizable material may be of a typical structure of: $CH_3CH_2$=CHCOO—$(CH_2)_n$-$(Ph)_n$-$(CH2)_n$—OOCHC=$CH_2CH_3$, in which Ph is a benzene ring.

According to embodiments of the present disclosure, the method for manufacturing an anisotropic organic thin film includes steps of: depositing a mixed solution including an ionic liquid and a polymerizable material on a substrate; separating positive ions from negative ions in the ionic liquid, so that the polymerizable material is correspondingly aligned; polymerizing the aligned polymerizable material, so that an aligned first thin film is obtained after cured; and depositing liquid crystal molecules on the first thin film after removing the ionic liquid, and polymerizing the liquid crystal molecules to form a second thin film, wherein the second thin film is aligned in a way that matches with the first thin film, and the first thin film and the second thin film constituent the anisotropic organic thin film. The method according to embodiments of the present disclosure is of advantages of being realized by a simple process, being capable of manufacturing an anisotropic organic thin film with a large area, and low cost. The manufactured anisotropic organic thin film is of a relative thin thickness, and defects caused by particles generated in friction do not exist since no mechanical friction is performed.

It would be appreciated that anisotropy involved in embodiments of the present disclosure refers to a phenomenon that a physical property is changed with different directions.

The terminologies involved in the present disclosure will be explained below prior to describing the technical solutions of the present disclosure in details.

The ionic liquid consists of positively-charged ions (positive ions) and negatively-charged ions (negative ions), being of an excellent solubility with organics and inorganics, good thermal and chemical stabilities, and easy to be separated from other materials, thereby capable of recycling. A series of ionic liquids were systematically synthesized through fixing negative ions (i.e., modifying imidazole with different substituents) by Bonhote P. and Dias A. in 1996.

Liquid crystal is one kind of phase state. The phase of the liquid crystal can be formed with a combination of molecules being of a particular shape, these molecules are flowable, being of an optical property of a crystalline, and sensitive to electromagnetic field. The liquid crystal is made of a kind of organic compounds, i.e., a compound being of a carbon-centered structure.

Details of the present disclosure will be described hereinafter in conjunction with drawings and embodiments. The following embodiments are for illustrating the present disclosure, but not intended to limit the scope of the present disclosure.

Figure 1:
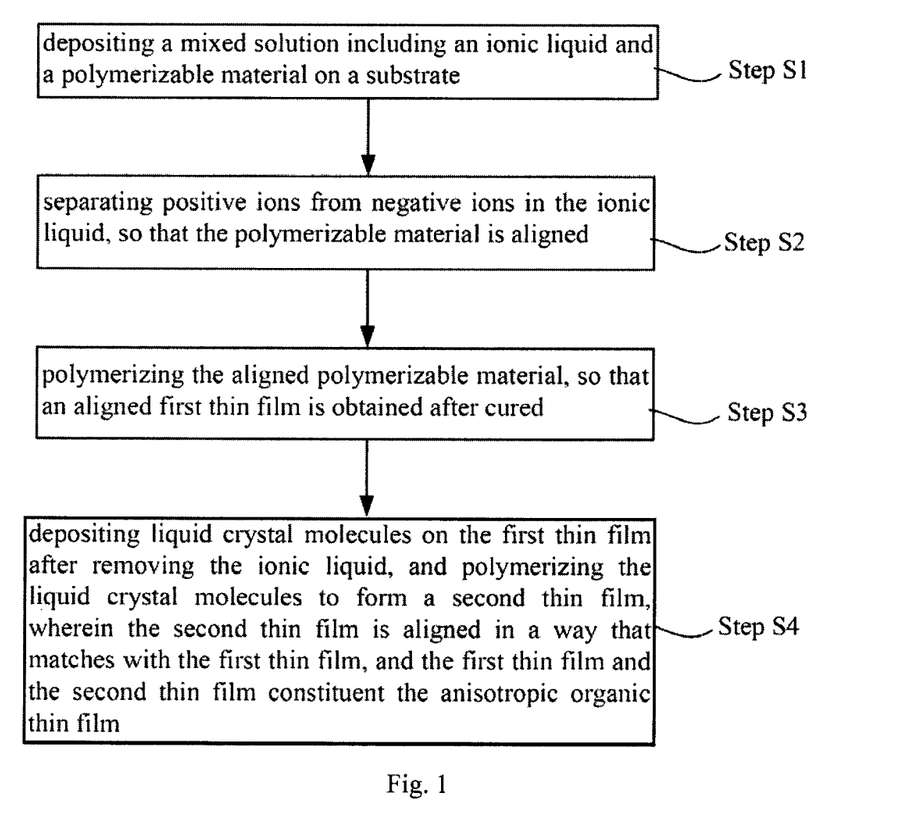
FIG. 1 is a flow chart showing a method for manufacturing an anisotropic organic thin film according to an example of the present disclosure.

As shown in FIG. 1, a method for manufacturing an anisotropic organic thin film according to embodiments of the present disclosure includes steps of:

Step S1: depositing a mixed solution including an ionic liquid and a polymerizable material on a substrate. The polymerizable material may be a photopolymerizable material, such as a photosensitive resin or photosensitive monomer containing polymerizable elements;

Step S2: separating positive ions from negative ions in the ionic liquid, so that the polymerizable material is aligned;

Step S3: polymerizing the aligned polymerizable material, so that an aligned first thin film is obtained after cured, wherein the first thin film may be a polymer thin film; and Step S4: depositing liquid crystal molecules on the first thin film after removing the ionic liquid, and polymerizing the liquid crystal molecules to form a second thin film, the second thin film being aligned in a way that matches with the first thin film, wherein the second thin film may be a liquid crystal polymer thin film, and the first thin film and the second thin film may constituent the anisotropic organic thin film.

The anisotropic organic thin film obtained by the above steps is of a relative thin thickness, and no defect is caused by particles generated in friction. In addition, such method has advantages of being realized by a simple process, being capable of manufacturing an anisotropic organic thin film with a large area, and low cost.

Figure 2:
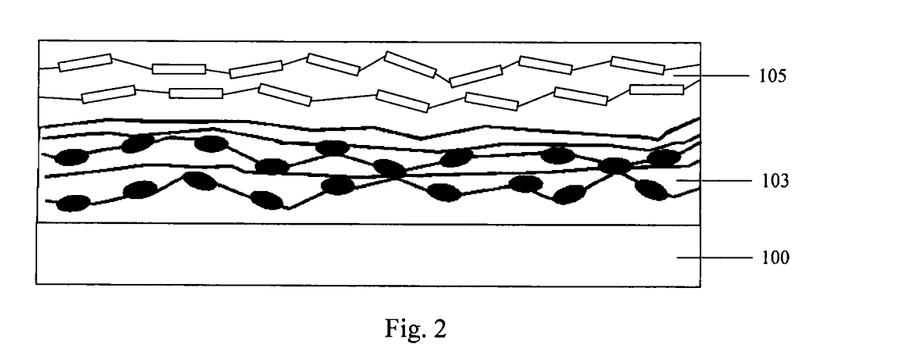
FIG. 2 is a schematic view showing an anisotropic organic thin film according to an example of the present disclosure.

As shown in FIG. 2, the anisotropic organic thin film obtained by the method according to embodiments of the present disclosure includes a first thin film 103 and a second thin film 105 formed on a substrate 100 successively. The first thin film 103 is a polymer thin film, the second thin film 105 is a liquid crystal polymer thin film. For forming the first thin film 103, the ionic liquid is used as a medium and is aligned under the action of an external electric filed, so that the polymerizable material is aligned; and then the aligned polymerizable material is polymerized and cured. For forming the second thin film 105 after removing the ionic liquid, firstly the polymerizable liquid crystal molecules are deposited on the first thin film 103; as a result of the interaction and correlation of the liquid crystal molecules, the deposited polymerizable liquid crystal molecules are aligned in a way of repeating, to the maximum extend, the manner in which the ionic liquid is aligned under a specific condition; and the aligned liquid crystal molecules are polymerized and cured, thereby the second thin film which is aligned in a way that matches with the first thin film 103 is formed.

In an embodiment, the ironic liquid has a side-chain group, such as a fluoride group. An acting force between the side-chain group and an atmosphere interface is larger than that between the polymerizable material and the atmosphere interface. Specific principles may refer to Okazaki M, Kawata K, Nishikawa H, Negoro M. Polymerizable discotic nematic triphenylene derivatives and their application to an optically anisotropic film. Polym Adv Technol. 2000.

According to an embodiment of the present disclosure, a homogeneous mixed solution including the ionic liquid and the polymerizable elements may be prepared in advance. According to an embodiment, the homogeneous mixed solution may be deposited on the substrate by spin coating, printing or transfer printing method. As the ionic liquid in the mixed solution has the side-chain group thereby have a larger acting force with the atmosphere interface, the ionic liquid having the side-chain group will be located above the polymerizable material along with volatilization of the solvent.

According to an embodiment, in order to facilitate the mixed solution to form a film, a film-forming agent may be further added into the mixed solution.

According to an embodiment, after the layers are separated, the ionic liquid and the polymerizable material are applied with unidirectional ionic wind or an external electric field parallel to the substrate, so that the positive and negative ions in the ionic liquid located in upper layer are separated from each other along a radial direction, as a result, the polymerizable material is aligned. According to an embodiment, the ionic liquid may be a liquid crystal ionic liquid. Because the liquid crystal is sensitive to electric field, the positive and negative ions in the ionic liquid film may be separated from each other by means of applying the electric field, thereby facilitate separation of the positive and negative ions.

According to an embodiment, the unidirectional ionic wind or the external electric field parallel to the substrate is kept applied, so that the polymerizable material is kept aligned; and then the polymerizable material is polymerized, so that the aligned first thin film is formed after cured, i.e., the aligned state of the polymerizable material is fixed. The first thin film may be a polymer thin film.

Figure 3:
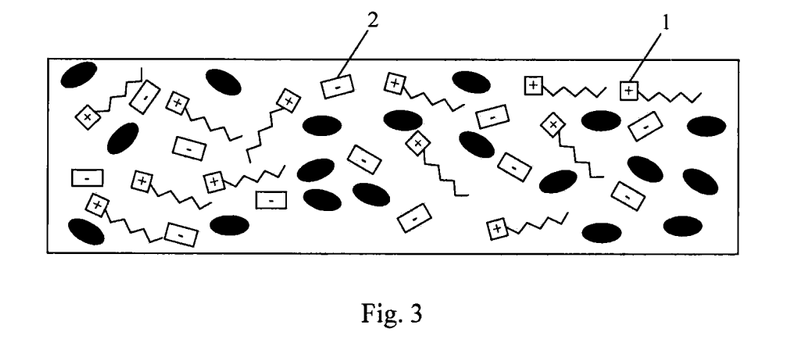
FIGS. 3-9 are schematic views showing steps of manufacturing an anisotropic organic thin film according to an example of the present disclosure.
Figure 4:
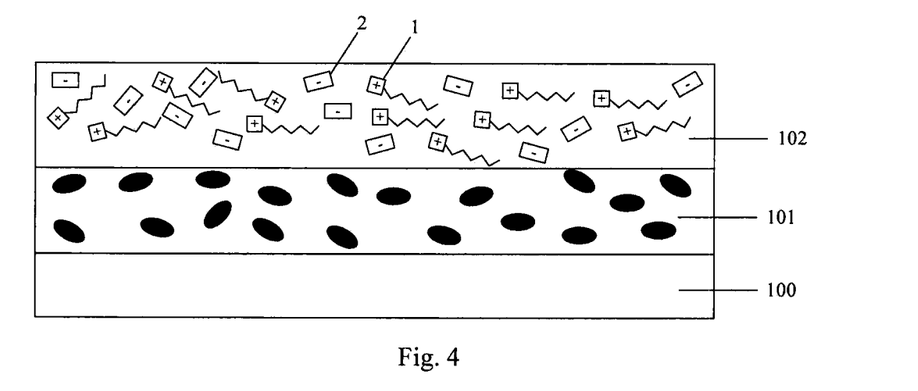
Figure 5:
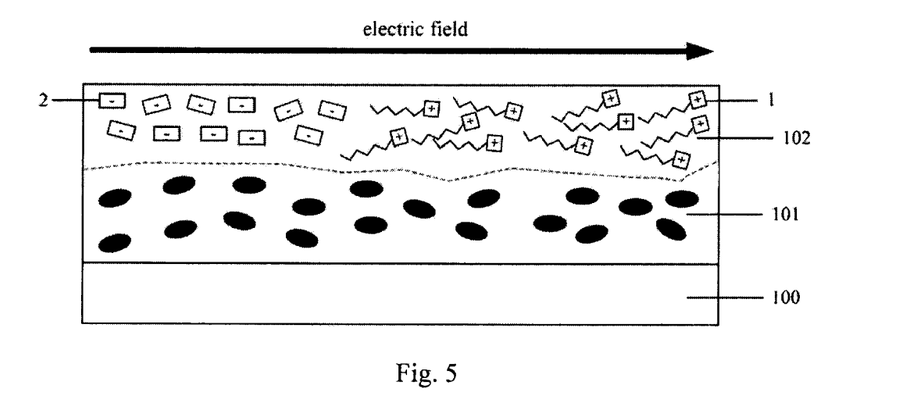

Referring to FIGS. 3-5, in embodiments of the present disclosure, the method for manufacturing the anisotropic organic thin film includes steps as follows.

Step 200: As shown in FIG. 3, a homogeneous mixed solution including an ionic liquid and a polymerizable material is prepared. The ionic liquid may be a liquid crystal ionic liquid including positive ions and negative ions. The polymerizable material may be a photosensitive resin or photosensitive monomer including polymerizable elements. The ionic liquid may also have a side-chain group, such as a fluoride group.

Step 201: The mixed solution is deposited on the substrate 100 in an atmospheric environment. The ionic liquid is located above the polymerizable material with the action of the side-chain group. As shown in FIG. 4, the mixed solution deposited on the substrate 100 includes the ionic liquid 102, as well as the polymerizable material 101 located between the substrate 100 and the ionic liquid 102.

In one embodiment, the homogeneous mixed solution may be deposited on the substrate 100 by spin coating, printing or transfer printing method. The mixed solution may include the ionic liquid, the polymerizable material and the film-forming agent. The ionic liquid has a fluoride group, and is located above the polymerizable material with the action of the fluoride group.

Step 202: After the layers are separated, unidirectional ionic wind or an external electric field parallel to the substrate is applied to the ionic liquid and polymerizable material, so that the positive ions and the negative ions in the ionic liquid 102 are separated from each other along a radial direction, thereby the polymerizable material 101 is correspondingly aligned, as shown in FIG. 5.

Figure 6:
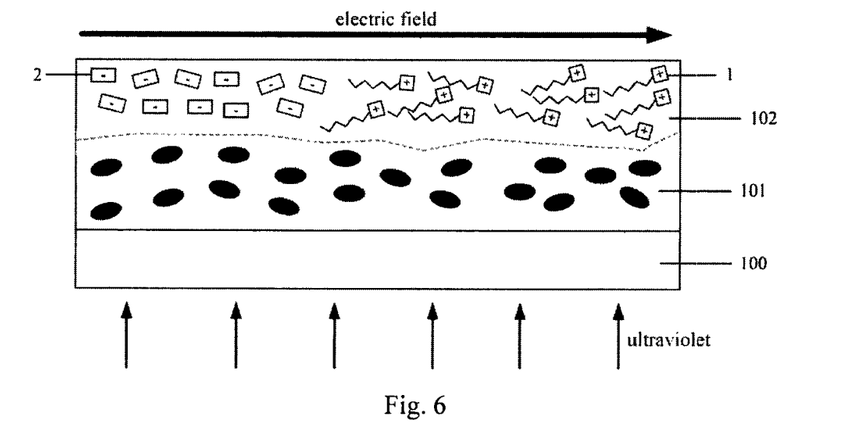
Figure 7:
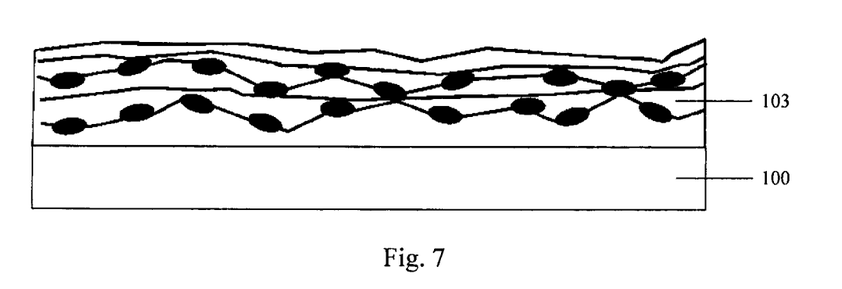

Step 203: The unidirectional ionic wind or the external electric field is parallel to the substrate is kept applied, and the polymerizable material 101 is polymerized by ultraviolet irradiation or heating. The polymerizable material 101 is converted into a cured polymer thin film along with increasement of polymerization, i.e., the first thin film 103 is formed, as shown in FIGS. 6 and 7.

Figure 8:
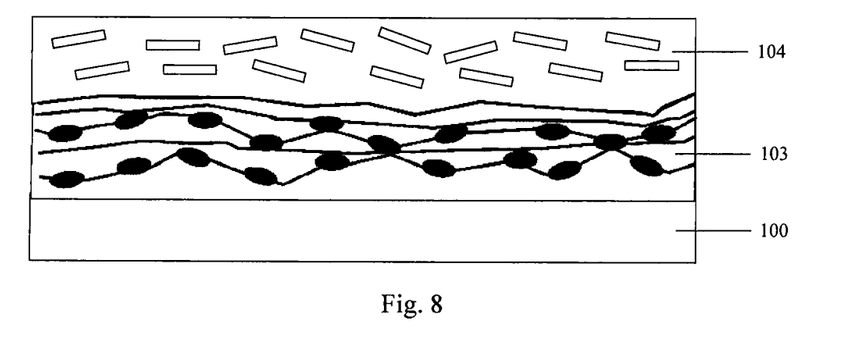
Figure 9:
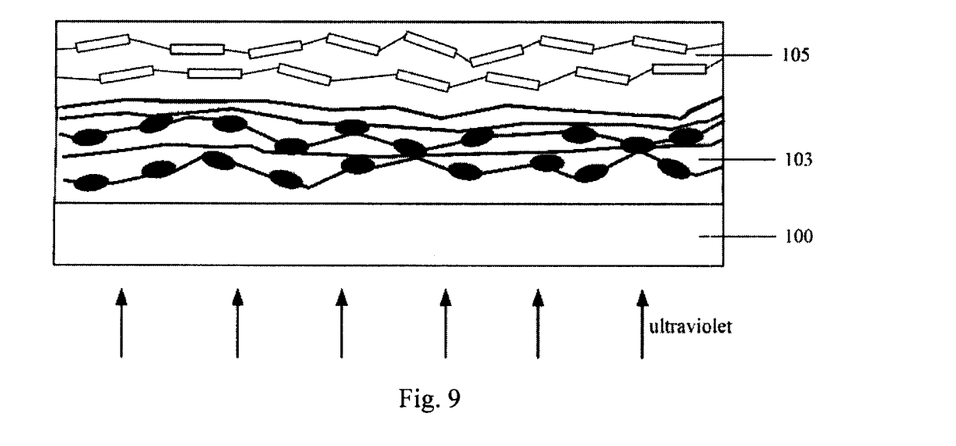

Step 204: Polymerizable liquid crystal molecules 104 are deposited on the first thin film 103 after removing the ionic liquid 102 from on the first thin film 103. As a result of the interaction and correlation of the liquid crystal molecules, the deposited polymerizable liquid crystal molecules are aligned a way of repeating, to the maximum extend, the manner in which the ionic liquid is aligned under the unidirectional ionic wind or external electric field. The aligned liquid crystal molecules 104 are polymerized by ultraviolet irradiation or heating, to form the second thin film 105, as shown in FIGS. 8 and 9. The second thin film 105 is aligned in a way that matches with the first thin film 103. The second thin film 105 is a liquid crystal polymer thin film.

According to an embodiment, the ionic liquid located above the obtained first thin film 103 may be washed off with a solvent. It would be appreciated that the step of removing the ionic liquid has a great effect on the performance of finally-obtained anisotropic organic thin film. For the organic thin film used for its insulating function, residual ionic liquid will do harm to the insulating performance. In addition, the ionic liquid may be recycled after the solvent in the ionic liquid is removed.

The anisotropic organic thin film with a relative thin thickness may be manufactured by the above steps.

The anisotropic organic thin film manufactured by the method according to embodiments of the present disclosure may be verified by an optical dichroism (UV/IR/visible light).

For the anisotropic organic thin film manufactured by the method according to embodiments of the present disclosure, a UV-absorbing spectral intensity is taken as a quantification indicator, therefore a UV-absorbing spectral intensity ratio of the anisotropic organic thin film in directions parallel and perpendicular to its alignment is obtained, and this ratio is generally between 1.0 to 1.2, indicating a good anisotropic property.

For a bottom-gate-bottom contacted organic thin film transistor, carriers in the operating state in a transmission region of a channel are concentrated within layers of tens to dozens of molecules where a gate insulating layer contacts with a source/drain electrode. Therefore, the quality of the gate insulating layer directly influences the performance of the organic thin film transistor. The anisotropic organic thin film manufactured by the method according to embodiments of the present disclosure is used as the gate insulating layer in a bottom-gate-bottom contacted organic thin film transistor, so as to guide the transmission direction of the carriers, thereby to increase one to two orders of magnitude of an operating current of the organic thin film transistor.

According to an embodiment, a method for manufacturing the bottom-gate-bottom contacted organic thin film transistor includes the following steps.

Step 300: A homogeneous mixed solution including an ionic liquid and a polymerizable material is prepared. The ionic liquid is a liquid crystal ionic liquid, including positive ions and negative ions. The polymerizable material is a photosensitive resin or photosensitive monomer containing polymerizable elements. The ionic liquid further has a side-chain group, such as a fluoride group.

Step 301: The mixed solution is deposited on the substrate formed with the gate electrode in an atmospheric environment. The ionic liquid is located above the polymerizable material with the action of the side-chain group. The mixed solution deposited on the substrate formed with the gate electrode includes the ionic liquid, as well as the polymerizable material located between the gate electrode and the ionic liquid.

According to an embodiment, a step of forming a gate electrode includes:

providing a substrate, forming a pattern of the gate electrode made of a gate metal layer on the substrate, in which the substrate may be a glass, quartz or organic resin substrate.

In one embodiment, a gate metal layer having a thickness of about 2500 Å to about 16000 Å may be deposited on the substrate by sputtering or thermal evaporation. The gate metal layer may be made of Cu, Al, Ag, Mo, Cr, Nd, Ni, Mn, Ti, Ta, W or other metals, or an alloy thereof. The gate metal layer may be of a single-layered structure, or a multi-layered structure such as Cu/Mo, Ti/Cu/Ti or Mo/Al/Mo. A layer of photoresist is applied onto the gate metal layer and then exposed and developed with a mask plate, so that the photoresist is formed into a photoresist reserved region corresponding to regions where the gate electrode is located as well as a photoresist unreserved region corresponding to a region other than the regions where the gate electrode is located. The gate metal layer corresponding to the photoresist unreserved region is fully etched off by an etching process, and then the remaining photoresist is removed, so as to form the gate electrode.

After the gate electrode is formed, the homogeneous mixed solution is deposited on the substrate formed with the gate electrode by spin coating, printing or transfer printing method. The mixed solution includes the ionic liquid, the polymerizable material and the film-forming agent. The ionic liquid has a fluoride group, which enables the ionic liquid to be located above the polymerizable material with the action of the fluoride group.

Step 302: Unidirectional ionic wind or an external electric field parallel to the substrate is applied to the ionic liquid and polymerizable material after the layers are separated, so that the positive ions and the negative ions therein are separated from each other along a radial direction, thereby the polymerizable material is aligned.

Step 303: The unidirectional ionic wind or the external electric field parallel to the substrate is kept applied, and the polymerizable material is polymerized by ultraviolet irradiation or heating. The polymerizable material is converted into a cured polymer thin film along with increasement of polymerization, i.e., the first thin film is formed. The first thin film is a polymer film.

Step 304: After the ionic liquid on the first thin film is removed, liquid crystal molecules are deposited on the first thin film. As a result of the interaction and correlation of the liquid crystal molecules, the deposited polymerizable liquid crystal molecules are aligned in a way of repeating, to the maximum extend, the manner in which the ionic liquid is aligned under the unidirectional ionic wind or the external electric field. Then the aligned liquid crystal molecules is polymerized by ultraviolet irradiation or heating, to form the second thin film. The second thin film is aligned in a way that matches with the first thin film. The second thin film is a liquid crystal polymer thin film.

Further, the transmission direction of carriers of the organic thin film transistor in operating state may be designed to be in consistent with the direction that the second thin film is aligned, so as to further improve carrier mobility.

According to an embodiment, the ionic liquid above the first thin film may be washed off with a solvent. It would be appreciated that the step of removing the ionic liquid has a great effect on the performance of the finally-obtained anisotropic organic thin film. For the organic thin film used for its insulating function, residual ionic liquid will do harm to the insulating performance. In addition, the ionic liquid may be recycled by separating and removing the solvent from the ionic liquid.

Step 305: A source electrode and a drain electrode are formed on the obtained anisotropic organic thin film.

In one embodiment, a source/drain metal layer having a thickness of about 2000 Å to about 6000 Å may be deposited on the substrate obtained after Step 304 by magnetron sputtering, thermal evaporation or any other film-forming methods. The source/drain metal layer may be made of Cu, Al, Ag, Mo, Cr, Nd, Ni, Mn, Ti, Ta, W or other metals, or an alloy thereof. The source/drain metal layer may be of a single-layered structure, or a multi-layered structure such as Cu/Mo, Ti/Cu/Ti or Mo/Al/Mo.

A layer of photoresist is applied onto the source/drain metal layer and then exposed and developed with a mask plate, so that the photoresist is formed into a photoresist reserved region corresponding to regions where the source electrode and the drain electrode are located as well as a photoresist unreserved region corresponding to a region other than regions where the source electrode and the drain electrode are located. The source/drain metal layer corresponding to the photoresist unreserved region is fully etched off by an etching process, and then the remaining photoresist is removed, so as to form the source electrode and the drain electrode.

Step 306: A pattern of an organic semiconductor layer is formed on the obtained anisotropic organic thin film, the source electrode and the drain electrode.

In one embodiment, an organic semiconductor layer having a thickness of about 300 Å to about 1500 Å may be deposited on the substrate obtained after Step 305 by magnetron sputtering, thermal evaporation or any other film-forming methods. The organic semiconductor layer may be made of organic micromolecules such as pentacene and triphenyl amine, or organic polymers such as polyacetylene or polyaryl.

A layer of photoresist is applied onto the organic semiconductor layer and then exposed and developed with a mask plate, so as to form a photoresist reserved region corresponding to regions where the organic semiconductor layer is located as well as a photoresist unreserved region corresponding to a region other than the regions where the organic semiconductor layer is located. The semiconductor layer corresponding to the photoresist unreserved region is fully etched off by an etching process, and then the remaining photoresist is removed, so as to form the pattern of the organic semiconductor layer. Further, the organic semiconductor layer located on the anisotropic organic thin film obtained above is designed to be aligned in the same way with the anisotropic organic thin film, so as to improve carrier mobility, thereby to further improve property of the organic thin film transistor.

The organic thin film transistor manufactured by the above steps is of an excellent property.

The ionic liquid is used as a medium and is aligned under the action of the external electric filed, so that the polymerizable material is correspondingly aligned; then the aligned polymerizable material is polymerized and cured, so as to obtain an aligned polymer phase state template; and then liquid crystal molecule monomers deposited on the polymer phase state template are polymerized, so that the anisotropic organic thin film is obtained. The method for manufacturing the anisotropic organic thin film according to embodiments of the present disclosure has advantages of being realized by a simple process, being capable of manufacturing the anisotropic organic thin film with a large area, and low cost. The manufactured anisotropic organic thin film is of a relative thin thickness and no defect is caused by particles generated in friction since no mechanical friction is performed.

The above are merely preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A method for manufacturing an anisotropic organic thin film, comprising steps of:
   depositing a mixed solution comprising an ionic liquid and a polymerizable material on a substrate;
   separating positive ions from negative ions in the ionic liquid, so that the polymerizable material is aligned;
   polymerizing the aligned polymerizable material, so that an aligned first thin film is obtained after polymerizing; and
   depositing liquid crystal molecules on the first thin film after removing the ionic liquid, and polymerizing the liquid crystal molecules to form a second thin film,
   wherein the second thin film is aligned in a way that matches with the first thin film, and the first thin film and the second thin film constitute the anisotropic organic thin film.

2. The method according to claim 1, wherein the ionic liquid has a side-chain group.

3. The method according to claim 2, wherein the side-chain group is a fluoride group.

4. The method according to claim 3, wherein the mixed solution further comprises a film-forming agent.

5. The method according to claim 4, wherein the ionic liquid is a liquid crystal ionic liquid, and
   the positive ions are separated from the negative ions in the ionic liquid under the action of unidirectional ionic wind or an external electric field, so that the polymerizable material is aligned.

6. The method according to claim 4, wherein the polymerizable material is a photopolymerizable material.

7. The method according to claim 3, wherein the ionic liquid is a liquid crystal ionic liquid, and
   the positive ions are separated from the negative ions in the ionic liquid under the action of unidirectional ionic wind or an external electric field, so that the polymerizable material is aligned.

8. The method according to claim 3, wherein the polymerizable material is a photopolymerizable material.

9. The method according to claim 2, wherein the mixed solution further comprises a film-forming agent.

10. The method according to claim 9, wherein the ionic liquid is a liquid crystal ionic liquid, and
    the positive ions are separated from the negative ions in the ionic liquid under the action of unidirectional ionic wind or an external electric field, so that the polymerizable material is aligned.

11. The method according to claim 9, wherein the polymerizable material is a photopolymerizable material.

12. The method according to claim 2, wherein the ionic liquid is a liquid crystal ionic liquid, and
    the positive ions are separated from the negative ions in the ionic liquid under the action of unidirectional ionic wind or an external electric field, so that the polymerizable material is aligned.

13. The method according to claim 2, wherein the polymerizable material is a photopolymerizable material.

14. The method according to claim 1, wherein the mixed solution further comprises a film-forming agent.

15. The method according to claim 14, wherein the ionic liquid is a liquid crystal ionic liquid, and
    the positive ions are separated from the negative ions in the ionic liquid under the action of unidirectional ionic wind or an external electric field, so that the polymerizable material is aligned.

16. The method according to claim 14, wherein the polymerizable material is a photopolymerizable material.

17. The method according to claim 1, wherein the ionic liquid is a liquid crystal ionic liquid, and
    the positive ions are separated from the negative ions in the ionic liquid under the action of unidirectional ionic wind or an external electric field, so that the polymerizable material is aligned.

18. The method according to claim 17, wherein the polymerizable material is a photopolymerizable material.

19. The method according to claim 1, wherein the polymerizable material is a photopolymerizable material.

* * * * *